(No Model.)

N. B. STOWERS.
DRIVING REIN GUIDE.

No. 280,530. Patented July 3, 1883.

Witnesses:
S. N. Piper
E. B. Pratt

Inventor:
Nathaniel B. Stowers.
by R. H. Eddy att'y

UNITED STATES PATENT OFFICE.

NATHANIEL B. STOWERS, OF SANDY POINT, MAINE.

DRIVING-REIN GUIDE.

SPECIFICATION forming part of Letters Patent No. 280,530, dated July 3, 1883.

Application filed October 27, 1882. (No model.)

*To all whom it may concern:*

Be it known that I, NATHANIEL B. STOWERS, of Sandy Point, in the county of Waldo, of the State of Maine, have invented a new and useful Improvement in Rein-Guides for Harnesses; and I do hereby declare the same to be described in the following specification and represented in the accompanying drawings, of which—

Figure 1:
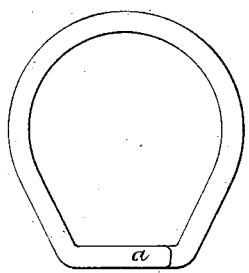
Figure 2:
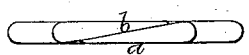
Figure 3:
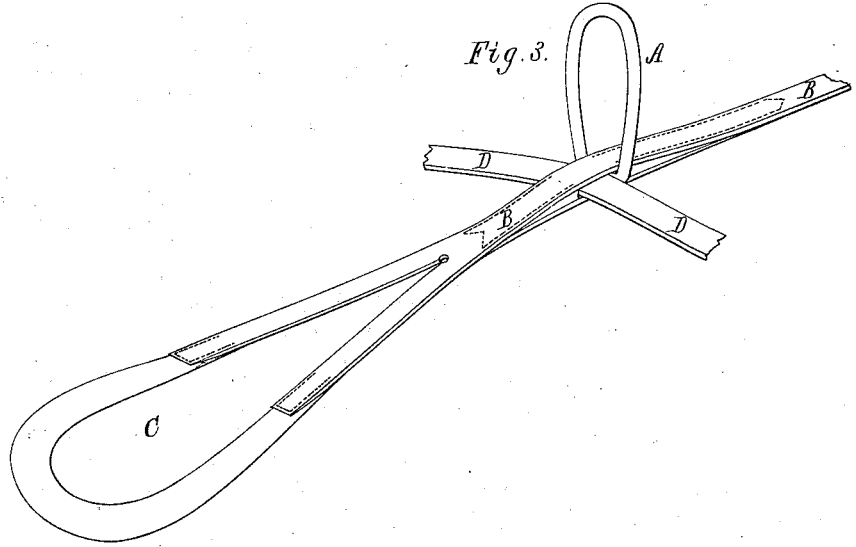

Figure 1 is a side elevation, and Fig. 2 a bottom view, of a rein guide or leader of my improved kind. Fig. 3 is a perspective view of it as applied to the back-strap of a harness.

The object of the invention is to support the driving-reins in a manner to prevent a horse's tail from getting between and over either of them while he may be switching it. For this purpose the guide is inserted in a loop, or that opening of the back-strap through which the breeching-sustaining strap usually runs.

The rein-guide is a ring, D or tunnel shaped, as shown, and having its straight or bearing part *a* split open diagonally, as represented at *b* in Fig. 2, such being to enable the ring to be inserted within the aforesaid opening of the back-strap B, so as to come directly over the rump of the horse. The said straight part or parts of the guide, when in the opening, enable the guide to turn therein in directions lengthwise, but not crosswise, of the horse. When the guide is in the back-strap and the rein is through the guide, such guide usually projects upward from the strap in manner as represented in Fig. 3, but when the rein is not in the guide the latter will readily fall flatwise down upon the back-strap.

In Fig. 3 the rein-guide is shown at A and the harness back-strap at B, the latter being provided with a crupper, C, and the breeching-sustaining strap D, the latter going through a loop or eye of the back-strap.

In practice I have found such an appendage to the back-strap exceedingly useful and amply sufficient to support the rein or reins, and to prevent such from being caught under the tail of the horse while he may be switching it.

I would remark that I am aware that the saddle of a harness is usually provided with rein-guides secured into it. This I do not claim, as my invention relates not only to a different kind of guide, but to a different application thereof for another or special purpose, as explained.

With such an appendage to the back-strap the rein, while held by a person, is sustained so near the tail of the horse that while the latter is being switched it will pass under the rein without catching it even when striking it.

I am also aware that harness has been provided at the crupper-strap or breeching-stays with guide-loops for the reins. These have either been permanently attached or else secured by means of devices which remain on the harness after the guide-loop has been removed.

In the present instance I use a simple split ring, which can be slipped in and out of position in the back-strap B. The harness, when used without the loop, is not disfigured by unused attachments, but has the appearance of ordinary harness.

To use my device the harness needs no special adaptation, but it can be applied to any harness by simply increasing slightly the opening in the back-strap through which the breeching-stays pass.

I am also aware that a split-ring, in itself, is not new.

What I claim is—

The combination of back-strap B and the detachable rein-guide A, the latter consisting of a D-ring whose straight side is split diagonally and rests within the back-strap, as set forth.

NATHANIEL B. STOWERS.

Witnesses:
J. C. STOWERS,
O. E. STOWERS.